Figures 1, 2:
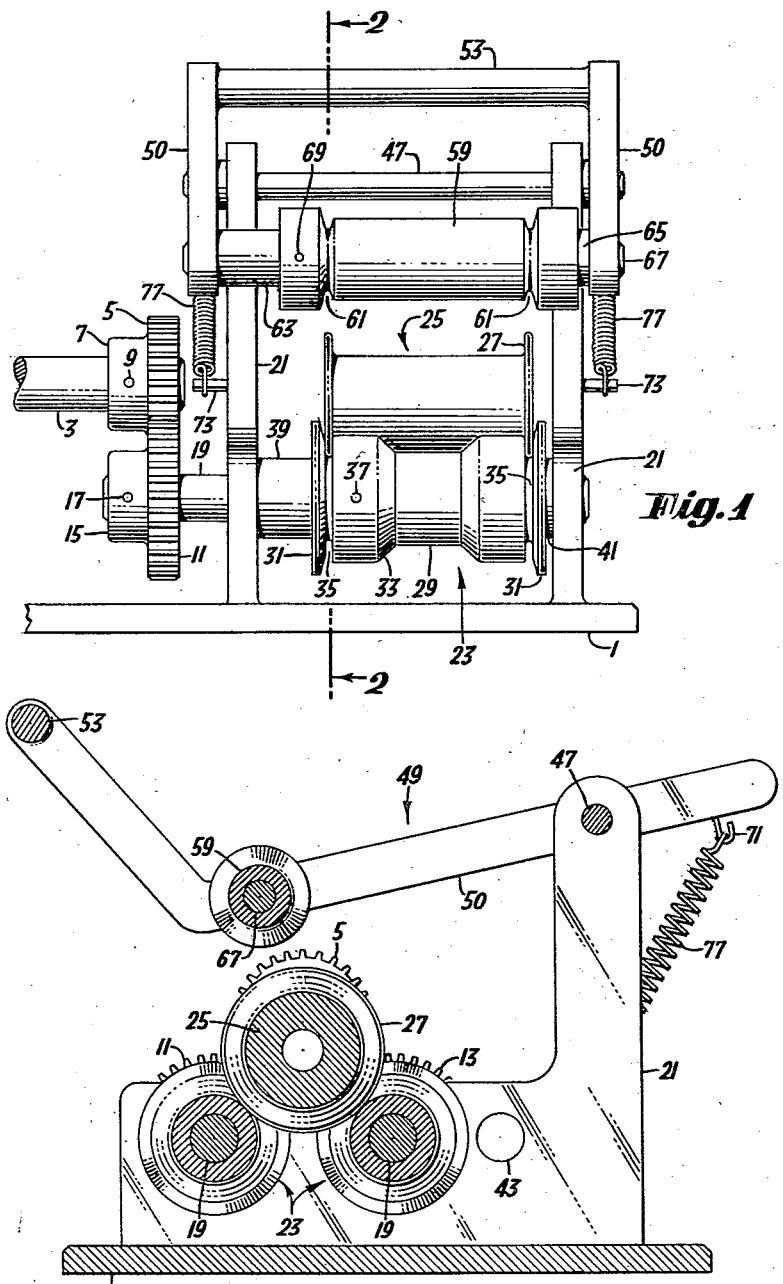

June 4, 1957   C. L. DOUGLAS   2,794,478
SPOOL FLANGE STRAIGHTENER
Filed April 12, 1954

INVENTOR
CLEON L. DOUGLAS
BY
Michael Hertz
ATTORNEY 2,794,478
Patented June 4, 1957

2,794,478
SPOOL FLANGE STRAIGHTENER

Cleon L. Douglas, Warren, Pa., assignor to Sylvania Electric Products Inc., a corporation of Massachusetts Application April 12, 1954, Serial No. 422,421

3 Claims. (Cl. 153—54)

This invention relates to machines for bending back to shape flanges of spools which have become warped. In particular it relates to machines for straightening bent or warped metal flanges on spools.

Frequently empty spools on which wire or fabric has been wound or spools intended to hold such material become unusable because of warped or bent flanges and therefore have to be discarded.

It is of course desirable to salvage these spools but because of the cheapness of the product it must be done in an economical manner. It is therefore an object of this invention to provide a machine which shall reclaim these spools in an economical and facile manner and put them into condition for use.

It is a further object of this invention to provide a simple and inexpensive machine for effecting straightening of spool flanges.

Other and further objects will be made clear upon consideration of the following description in connection with the accompanying drawing in which:

Fig. 1 is a front elevational view of the machine with the motor drive means broken away, showing a spool mounted on lower straightening rollers and Fig. 2 is a side elevational view of the same.

Referring to the drawings more in detail, there is illustrated a base 1 on which is adapted to be mounted a motor frame, not shown. The motor has an armature shaft 3 on which is fixedly mounted a spur gear 5, as by a hub 7 provided with a set screw 9.

The gear 5 meshes with a pair of spur gears 11, 13 which gears, like gear 5, have hubs 15 suitably fastened, as by set screws 17, to a pair of forming roller support shafts 19. Only the front gear 11 and hub 15 is seen in Fig. 1, it being understood that a second similar arrangement is spaced rearwardly of the front assembly. The gears 11 and 13 are both driven in the same direction from the drive gear 5. Each of the shafts 19 is supported by a pair of suitable bearings in a pair of L-shaped frame members 21 suitably mounted on the base member as by welding the same thereto. The bearings are mounted in the horizontal reaches of the L-shaped members and are suitably spaced apart longitudinally of the horizontal reaches to provide for mounting of a forming roller 23 on each shaft with the roller peripheries spaced from one another to provide space therebetween and above the rollers for a spool 25 whose flange 27 is to be straightened. These forming rollers 23 each comprise a hub section 29 and two flanges 31. The hub section terminates in two flared ends 33, with a groove 35 formed between each flared end and flange. The forming rollers are secured to the shafts 19 by suitable means, as by set screws 37 engaging flats on the shafts. Since the frame structure supporting the forming rollers is intended for use with spools of various lengths and of various flange depths, a series of forming rollers is provided and suitable spacer collars 39 of various sizes and washers 41 are provided to take up the free space on the shafts 19 between the ends of the forming rollers and the side frames. Also an extra pair of aligned bearings, of which one only is indicated at 43, is provided into which a shaft 19 may be inserted should it be desired to provide wider spacing between the shafts than is shown in Fig. 2. Of course, a suitable drive gear may then replace the gear 5.

At the upper end of the L-shaped frame members there is a carriage shaft 47 threaded through the L-shaped arms and through suitable pivot apertures in a top roller carriage 49. The shaft 47 is held in place in any conventional manner. The carriage 49 is provided with a bail shaped operating handle 53.

Mounted near the handle end of the carriage is a top roller 59 having grooves 61 spaced apart the same distance that grooves 37 in rollers 23 are spaced apart. The grooves in top roller 59 are lined up with the grooves 35 in the respective lower forming rollers by a suitable spacer 63 and washer 65. This top roller, of course, is replaced by another suitable roller when the bottom forming rollers are changed. The roller, spacer and washer are mounted on a top roller shaft 67 held in the arms 50 by suitable means, as set screws 69 bearing against flattened portions of the shaft.

To bias the carriage 49 so that the roller 59 will normally admit of a spool being laid on the forming rollers, the rear ends of the arms 50 are provided with hooks 73 and the L-shaped frame members 21 are provided with pins 73 and coil springs 77 are spanned across the hooks and pins.

In use, the motor is started and spools which have warped flanges are laid successively on the forming rollers. After a spool has been laid on the forming rollers the top carriage roller 59 is brought down on the flanges of the spool, by means of the bail 53, with sufficient pressure to cause the forming rollers 23 to drive and rotate the spool via its flanges. The movement of the spool flanges past the grooves 35 and 61 corrects bent flanges thereby salvaging spools which otherwise would have to be scrapped or treated in a much more expensive fashion. When the handle is released, the springs 77 raise the roller 59 and free a spool sufficiently for ready removal and replacement by another spool.

Having thus described my invention, what I claim is:

1. A spool flange straightener comprising a base having at least one driven grooved roller and a support member parallel to the roller for accommodating a flanged spool between the grooved roller and the support member with the flange of the spool resting in the groove in the grooved roller, and a pivotally mounted carriage on the base carrying a corresponding grooved roller movable to a position where its roller is in spaced relation to the first roller and to a position further away therefrom.

2. A spool flange straightener comprising a base having a pair of parallelly arranged grooved rollers, a carriage pivoted on the base and carrying a cooperating grooved roller, corresponding grooves in the several rollers lying in common planes, means for driving at least one of the rollers and resilient means biasing the carriage so as to move the carriage roller away from the pair of rollers.

3. A spool flange straightener comprising a base having a pair of parallelly arranged grooved rollers, a carriage pivoted on the base and carrying a cooperating grooved roller, corresponding grooves in the several rollers lying in common planes, means for driving at least one of the rollers, resilient means biasing the carriage so as to pivot the carriage with its roller away from the pair of rollers and handle means to overcome the biasing means and press the carriage roller onto the flanges of a spool interposed between the three rollers.

References Cited in the file of this patent

UNITED STATES PATENTS

| 418,229 | Roenspiess et al. | Dec. 31, 1889 |
| 635,433 | Einfeldt | Oct. 4, 1899 |
| 1,045,161 | Machlet | Nov. 26, 1912 |
| 1,151,995 | Batchelder | Aug. 31, 1915 |